United States Patent [19]
Gore

[11] Patent Number: 5,866,867
[45] Date of Patent: Feb. 2, 1999

[54] SURFACE MOUNT PACKAGE SEAM WELDER APPARATUS AND METHOD

[75] Inventor: John G. Gore, Sorrento, Fla.

[73] Assignee: Sawtek Inc., Orlando, Fla.

[21] Appl. No.: 865,605

[22] Filed: May 29, 1997

[51] Int. Cl.[6] .................................................. B23K 11/06
[52] U.S. Cl. ................................ 219/110; 219/82; 219/83
[58] Field of Search ............................... 219/110, 81, 82, 219/83, 117.1

[56] References Cited

U.S. PATENT DOCUMENTS

| | | |
|---|---|---|
| 2,407,676 | 9/1946 | Munson . |
| 3,435,181 | 3/1969 | Walkow . |
| 3,468,523 | 9/1969 | Dix . |
| 3,798,407 | 3/1974 | Becker . |
| 4,168,430 | 9/1979 | Denis et al. ............................ 219/110 |
| 4,536,637 | 8/1985 | Horiuchi et al. . |
| 4,551,745 | 11/1985 | Watanabe . |
| 4,894,508 | 1/1990 | Glenn et al. ............................ 219/110 |
| 4,902,868 | 2/1990 | Slee et al. . |
| 5,089,582 | 2/1992 | Davies . |
| 5,389,761 | 2/1995 | Kresse, Jr. . |
| 5,462,626 | 10/1995 | Kanayama et al. . |
| 5,527,992 | 6/1996 | Terajima . |

FOREIGN PATENT DOCUMENTS

| | | |
|---|---|---|
| 54-32155 | 3/1979 | Japan . |
| 5-161982 | 12/1991 | Japan . |
| 5-161982 | 6/1993 | Japan . |

*Primary Examiner*—Clifford C. Shaw
*Attorney, Agent, or Firm*—Allen, Dyer, Doppelt, Milbrath & Gilchrist, P.A.

[57] ABSTRACT

A seam welder for sealing a cover of a surface mount package to its carrier includes a table for receiving a fixture which itself carried surface mount packages to be welded for sealing an electronic component therein. Electrical current to welding electrodes is controlled for resistance welding the cover to the carrier. Electrode temperature and table temperature and monitored. Heat exchangers including a reservoir and heat transfer fluid interface with the electrodes and the table for controlling their respective temperatures and thus the temperature of the fixture and package during the welding of the cover to the carrier. Factors affecting the quality of the weld, including temperature, time/temperature profile, the temperature of the electrode just before current starts to flow, the temperature of the package/cover and carrier combination just before current starts to flow, the difference between the package/cover and carrier combination temperature and the electrode temperature just before current starts to flow, are monitored and controlled. As a result of such monitoring and control, induced stresses typically resulting in a package because of the differing coefficients of thermal expansion for the materials used in the package are reduced during and after sealing the cover to the carrier. Seal quality and integrity is improved and the range of seal parameter tolerances tightened.

36 Claims, 4 Drawing Sheets

SURFACE MOUNT PACKAGE SEAM WELDER APPARATUS AND METHOD

FIELD OF INVENTION

The invention relates generally to seam welders, and more particularly to control of welding parameters, including temperature control of a seam sealing process for attaching metal covers to a sealing surface of a ceramic chip carrier, typical of electronic surface mount packages.

BACKGROUND OF THE INVENTION

It is well known to use a seam sealing process to attach metal covers to the seal surface of ceramic chip carriers to provide a hermetically sealed package for electronic components such as a surface acoustic wave filter. The carriers are normally rectangular or square and have a metal surface to accept the metal cover. The length and width of the cover match the length and width of the sealing surface on the ceramic carrier to within 0.001 inches. The sealing surface on the package is a metal frame that is brazed onto a metallized pattern on the uppermost ceramic layer of the carrier so that the metal seal ring becomes the uppermost surface of the ceramic carrier. The opening in the center of the seal ring typically matches the opening in the ceramic carrier that accepts the electrical components.

In the sealing process the cover is accurately located on the seal ring (typically by placing the cover with a mechanism that is guided by a vision or pattern recognition system). As the cover is placed, it is lightly tack-welded into place in order to maintain the relative position of the cover to the seal ring through seam weld sealing.

The seam sealing process incorporates the use of fixturing to hold a matrix of multiple packages and rotate the matrix of packages 90 degrees in order to obtain seam sealing along the length and width of a rectangular shaped package. Typically, the seam sealer or welder has 2 tapered metal rollers as electrodes that actually contact the cover during seal. The rollers are energized so that electrical current passes from one roller, through the cover and seal ring combination, and finally into the other roller. This electrical current passing through the metal components results in heat generation (current squared×resistance=watts−heat energy) within the various metal components.

As heat is generated at various locations during the sealing process the temperature of each component will change relative to the amount of heat, the electrical resistivity, and the heat capacity of the component parts. Since heat flow is driven by temperature differences then the heat flow and temperature changes will be directly effected by the starting temperatures of all components that are subjected to the heat. Thus, it is unlikely that all components will be at the same temperature when serially sealing multiple parts.

By way of example, temperature control of electrodes is known as evidenced in U.S. Pat. Nos. 5,089,682 to Davies and 2,407,676 to Munson, by way of example. However, it needs to be understood that sealing parameters such as roller pressure, seal current, roller temperature, fixture temperature, package temperature, roller velocity, current pulse duration and frequency all must be controlled and be repeated from package to package in order to have a truly controlled process that will yield high percentages of hermetically sealed parts within packages without defects in their seal.

In the typical seam sealing scenario, the temperature of all components generally starts low (maybe near room temperature) and climbs slowly (uncontrollably) with each additional package that is sealed. This requires that the seal parameters be modified repeatedly as the sealing process is repeated through some large number of packages that are typical in a hi-volume production situation. By way of example, as the first package is sealed all components (package fixture, carrier, cover, rollers, roller mounts, etc.) are near ambient temperature. With each additional package that is welded the temperature of each component changes. Eventually, the hermetic seal of one of the packages is corrupted by the now out of specification seal parameters so weld parameters must be adjusted to yield a desired seal with all of the new temperatures in the system.

Temperature is important since this is a sealing process that incorporates the melting and mutual reflow of some portion of the cover and seal ring to accomplish the hermetic seal. It is ultimately important to achieve a liquid state in the parts to be joined without the temperature being excessive.

As the components of the sealing system change temperature this means that the optimum seal conditions are only present for a few (maybe only one) packages and that these conditions change as the various temperatures change until the seal conditions are grossly out of spec and the seal quality is poor. After a parameter change to compensate for these new temperature the first few packages may have optimum settings but quickly the sealing or welding conditions will degrade as temperature changes. These temperature changes can be up or down. The temperature will typically go up as parts are sealed one after the other and heat is continually generated within the systems components but the temperature can also go down. By way of example, a welder operator goes to lunch or takes a break and thus creates a situation where the temperature would rise or fall at random.

So, simply stated, desirable sealing conditions exist for only a very small percentage of packages within the matrix of packages being welded, a problem in the art. In addition, a new problem has been identified that compounds the package sealing difficulties. It is the stress that is induced in the cover and carrier combination during and after the welding or sealing process that is caused by a mismatch of the coefficients of thermal expansion of the various materials that make up the carrier and cover. When the carrier and cover are ready for sealing they are each at some temperature and typically they are usually at the same temperature. Although they could be at any temperature for various reasons. By way of example, assume that they are at nearly the same temperature, this being the most common situation.

As the sealing process begins, the temperature of the cover and carrier, the package, begin to rise during this sealing process they will both rise, most likely not the same amount, until they reach their respective maximums and then they cool down after the sealing by the seam welding process has been completed. In this cool down period the cover and carrier are intimately joined and will cool at very near if not exactly the same rate and finally settle somewhere close to an ambient temperature. Since they have differing coefficients of thermal expansion, they did not change dimension or size at an equal rate and thus the ultimate change in size of the cover is not the same as it is for the carrier. So each element is attempting to cause the other to conform to its size. This results in a mechanical stress in the package, the carrier and cover assembly. In other words if you consider that some amount of force is required to cause the package to fracture, this stress induced by the cool down after sealing, attaching the cover to the carrier through a seam welding, has now decreased the total stress from outside sources that would be required to fracture the package.

The total stress required to fracture the package is now typically equal to the total stress minus the seal induced stress. Tests carried out at Sawtek, Inc. have shown this to be the case. Package fracture problems have been observed on surface mount ceramic packages. The ceramic package was subjected to an outside mechanical stress and repeatedly resulted in package cracking. A device was built to accurately reproduce the outside stress and it was found that empty packages without a cover required more mechanical stress to create a fracture than did those packages that had sealed covers in place.

There is a need to reduce and even eliminate the induced stress resulting from the differing coefficients of thermal expansion (CTE).

SUMMARY OF INVENTION

In view of the foregoing background, it is therefore an object of the invention to provide an apparatus and associated method for controlling the temperatures of the package having a cover which is seam welded to a carrier in order to reduce the CTE induced stress for the package at its ambient temperature after sealing the cover to the carrier. It is further an object to improve the quality and integrity of the weld, wherein a range of seal parameter tolerances is drastically tightened.

This and other objects, advantages, and features of the present invention are provided by an electric resistance seam welding apparatus useful in sealing the cover to the carrier. The seam welding apparatus of the present invention comprises a table for receiving a fixture, a fixture carried by the table, a welding electrode for seam welding the cover to the carrier, electrical current control means for controlling an electrical current flowing from the electrode to the cover for effecting a weld of the cover to the carrier, electrode temperature sensing means for sensing the temperature of the electrode, fixture temperature sensing means for sensing the temperature of the fixture, electrode temperature control means for controlling the temperature of the electrode, and table temperature control means for controlling the temperature of the table, the table temperature control means communicating with the fixture temperature sensing means for effecting the temperature of the table and thus the fixture and package. The electrode temperature control means communicates with the electrode temperature sensing means. The fixture is in frictional contact with the table for providing a heat transfer therebetween. Further, a surface mount package is carried by the fixture, wherein the package is in frictional contact with the fixture for providing a heat transfer therebetween. The surface mount package is adapted for receiving an electronic component therein and comprises the carrier for receiving the electronic component and the cover attachable to the carrier for hermetically sealing the electrical component within the package. The electrode is adapted for contacting the cover and providing a seam welding of the cover to the carrier.

Seam welding the cover to the carrier within the apparatus above described, includes apparatus elements that undergo temperature changes throughout welder operation and typically throughout the workday. A method aspect of the present invention is provided that controls various element temperatures so that they remain within a desirable range.

The method is directed to seam welding a cover to a carrier of a package for hermetically sealing an electronic component within the package. The method comprises the steps of providing a seam welder having a table for receiving a fixture and an electrode adapted for seam welding a cover to a carrier, providing a surface mount package having a carrier for receiving an electronic component and a cover attachable to the carrier for enclosing the electronic component therein, mounting the package onto a fixture, mounting the fixture onto a table, contacting the cover with the electrode for seam welding the cover to the carrier, sensing the temperature of the electrode, sensing the temperature of the fixture, controlling an electrical current flowing from the electrode to the cover for effecting a weld of the cover to the carrier, seam welding the cover to the carrier, controlling the temperature of the electrode, and controlling the temperature of the table, for affecting the temperature of the table and thus the fixture and package during the seam welding step. The package is placed in frictional contact with the fixture for providing a heat transfer therebetween, and the fixture is mounted in frictional contact with the table for providing a heat transfer between the fixture and the table.

Since welding parameters typically have specific settings used to obtain hermetically sealed packages, the method and the controlled temperatures provide additional seal parameters that improve upon well-known seam welding control parameters such as pressure, electrical current and voltage.

BRIEF DESCRIPTION OF DRAWINGS

A preferred embodiment of the invention as well as alternate embodiments are described by way of example with reference to the accompanying drawings in which.

DETAILED DESCRIPTION OF THE PREFERRED EMBODIMENTS

Figure 1:
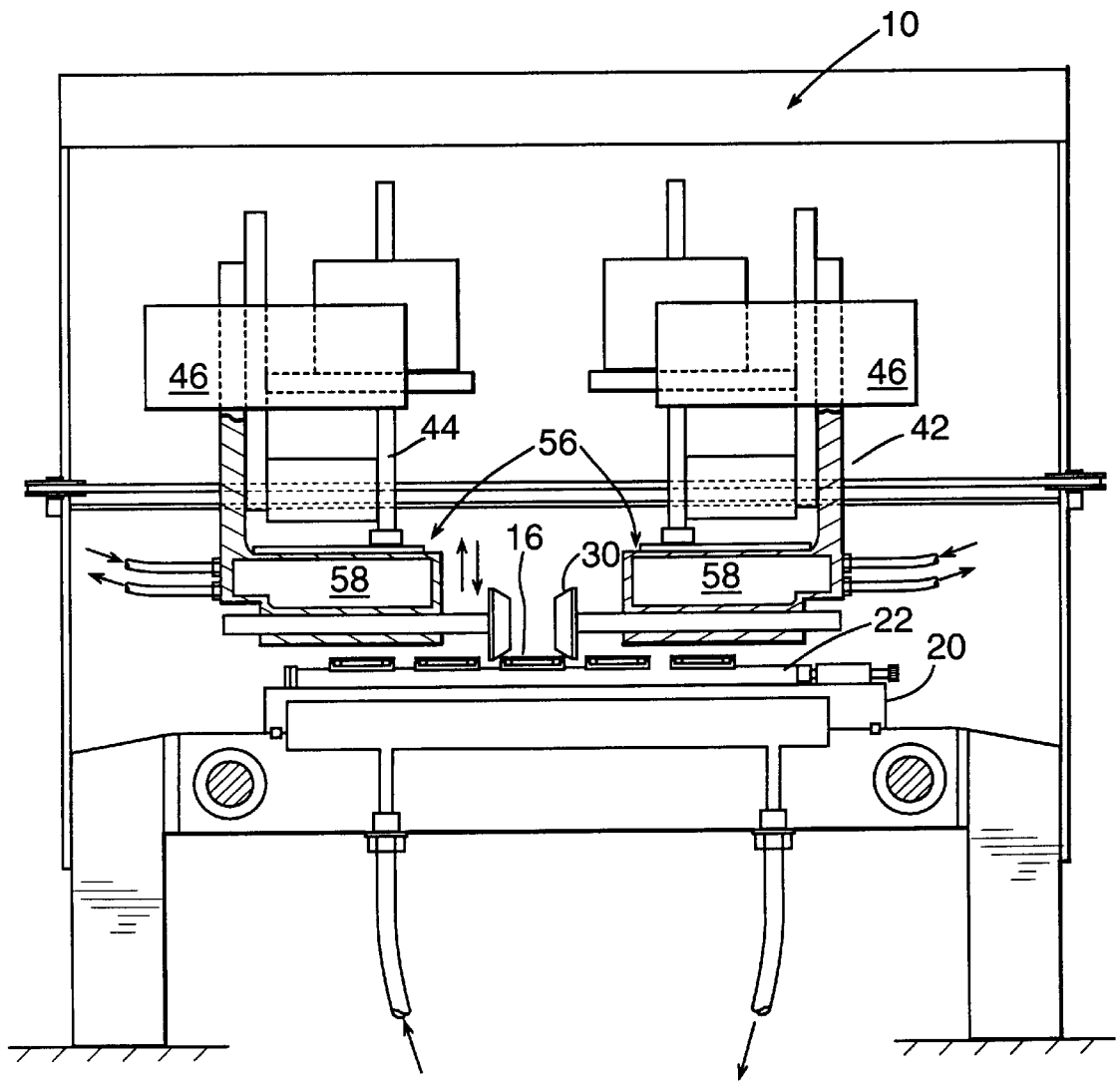
FIG. 1 is a partial front elevational view of one preferred embodiment of the seam welder of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring now initially to FIGS. 1–4, an electric resistance seam welding apparatus 10, useful in sealing a cover 12 to a carrier 14 of a surface mount package 16 carrying an electronic component 18 therein, comprises a table 20 for receiving a fixture 22. The fixture 22 is carried by the table 20 and is in frictional contact with the table for providing a heat transfer therebetween. The surface mount package 16 is carried by the fixture 22 wherein the package in frictional contact with the fixture for providing a heat transfer therebetween. The surface mount package 16, as illustrated again with reference to FIGS. 3 and 4, is adapted for receiving the electronic component 18, and comprises the carrier 14, typically make from a ceramic material for surface mount packaged used with surface acoustic wave components. The cover 12 is attachable to the carrier 14 for enclosing the electronic component 18 therein. With such packages 16 as herein described, by way of example, a metal seal ring 24 is positioned between the carrier peripheral portion 26 and the cover peripheral portion 28.

Figure 2:
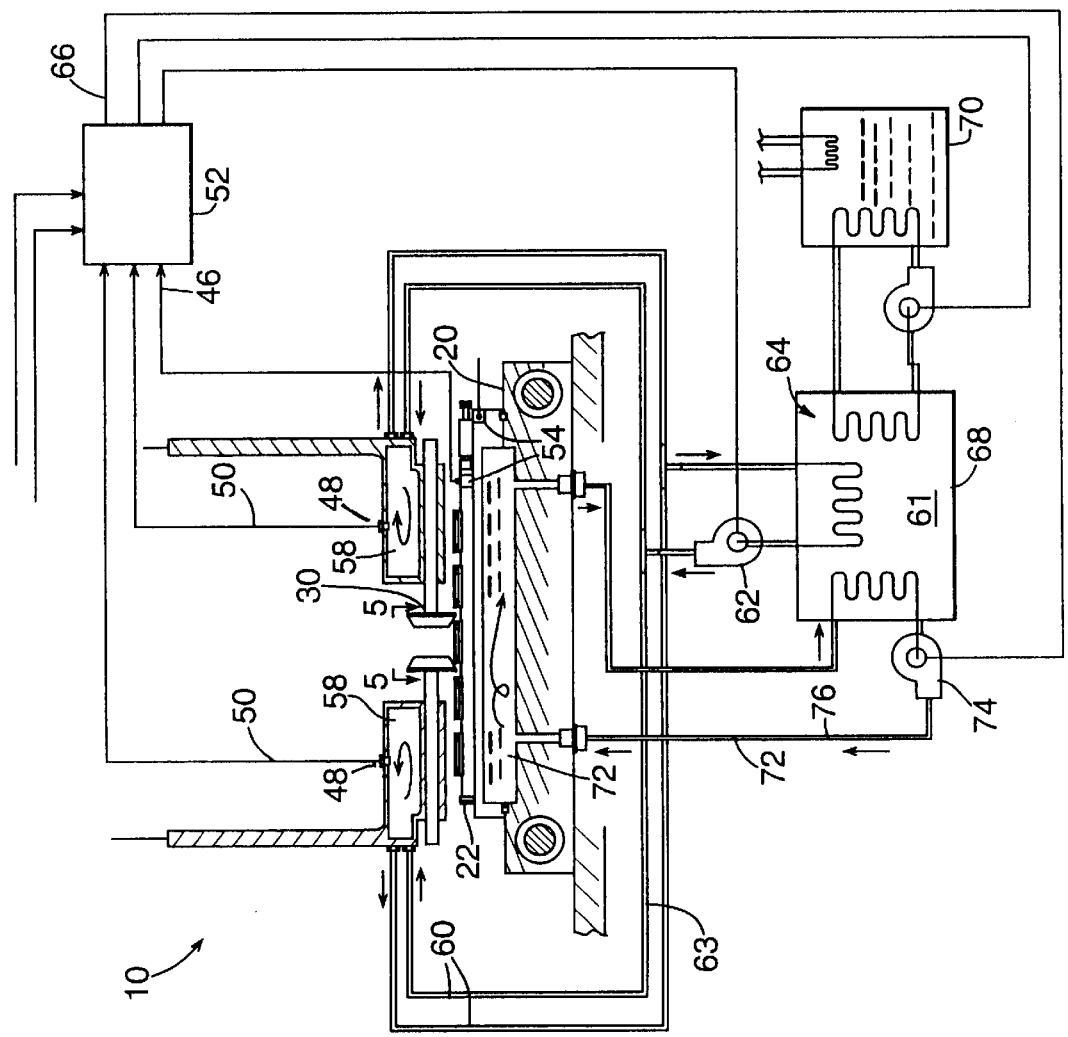
FIG. 2 is a schematic diagram of a seam welder of the present invention.
Figure 5:
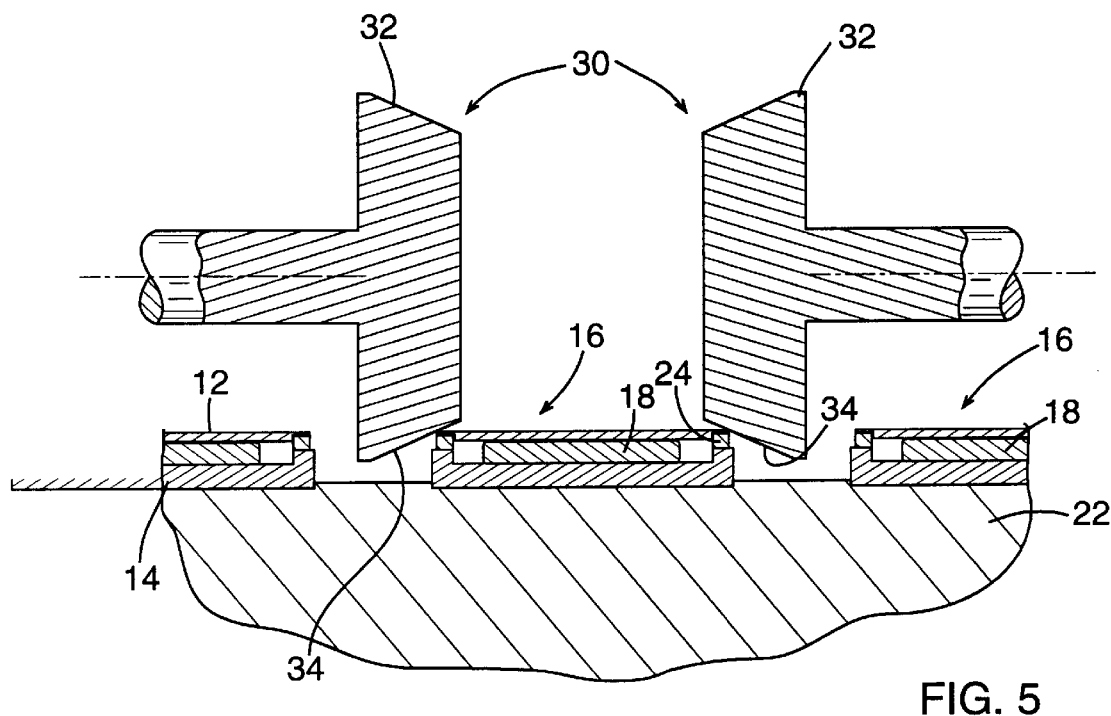
FIG. 5 is a partial cross-sectional view of a package and electrodes taken through lines 5—5 of FIG. 2.
Figure 3:
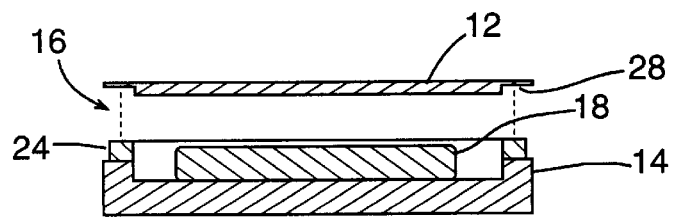
FIG. 3 is an exploded cross-sectional view of a surface mount package and cover.
Figure 4:
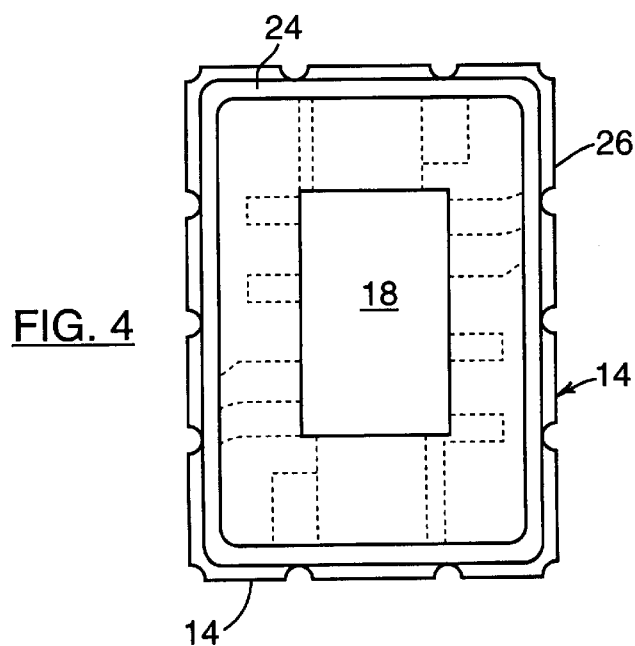
FIG. 4 is of a top plan view of a carrier for a surface mount package.
Figure 6:
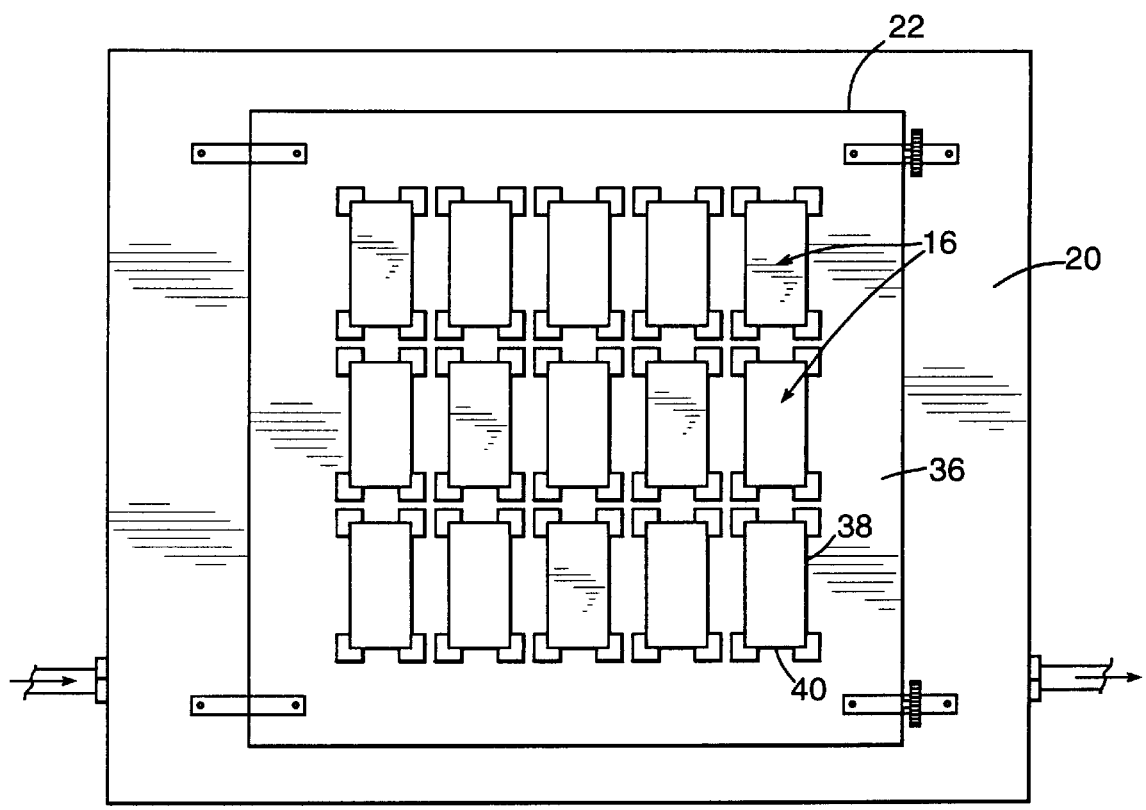
FIG. 6 is a top perspective view of a table and fixture illustrating an arrangement of multiple packages within the fixture.

As illustrated with reference to FIG. 5, and again to FIGS. 1 and 2, the seam welding apparatus 10 comprises welding electrodes 30 for seam welding the cover 12 along its peripheral portion 28 to the carrier 14 along its peripheral portion 26. The electrodes 30 are adapted for contacting the cover peripheral portion 28 and in a preferred embodiment, each electrode 30 comprises a tapered metal roller 32 having a rolling edge portion 34 for contacting the cover peripheral portion. As illustrated with reference to FIG. 6, the seam welding process incorporates the use of the fixture 22 to hold a matrix 36 of multiple packages 16 and rotates the matrix of packages 90 degrees in order to obtain seam sealing along the length 38 and width 40 for a typically shaped rectangular package. The welding apparatus 10 comprises a table and electrode slide assembly 42 for moving the electrodes 30 across the cover 12 for the seam welding thereof. As earlier described, the packages 16 must be held to the fixture 22 for providing a good heat transfer between the package and fixture. Alternate attaching methods as illustrated again with reference to FIGS. 5 and 6 will be used by those skilled in the art. A pressure controller 44 provides a controller contact pressure between the electrodes 30 and the cover 12.

The rollers 32 are energized so that electrical current passes from one roller, through the cover 12 and seal ring 24 combination, and finally into the other roller. This electrical current passing through the metal components results in heat generation (current$^2$×resistance=watts–heat energy) within the various metal components. As illustrated again with reference to FIG. 1, an electrical current controller 46 is provided for controlling the electrical current flowing from the electrodes 30 to the cover 12 for effecting a weld of the cover to the carrier 14.

As illustrated again with reference to FIG. 2, electrode temperature sensors 48 for sensing the temperature of each electrode 30 provide an input signal 50 to a programmable controller 52. Fixture temperature sensors 54 positioned directly on the fixture 22, or in the alternative on the table 20 proximate the fixture, sense the temperature of the fixture and provide further temperature input 50 to the controller.

Again as illustrated with reference to FIGS. 1 and 2, the apparatus 10 provides for monitoring of electrode temperature through the sensor 48 and controller 52. Electrode temperature control, in a preferred embodiment of the present invention, includes an electrode housing 56 for carrying the electrode 30. The housing 56 comprises a passage 58 adapted for directing a heat transfer fluid 60 therethrough. A pump 62 and conduit 63 transfers the fluid 60 between the passage 58 and a reservoir 64 in response to controller output signals 66 for controlling the electrode temperature through well known varying flow rates and reservoir fluid 61 temperatures. In one embodiment of the apparatus 10, the fluid 60 flowing through the passage 58 is isolated from the reservoir fluid 61 through a heat exchanger 68 methods, as again illustrated with reference to FIG. 2. A second heat exchanger 70 is used for controlling the temperature of the reservoir fluid 61 within the reservoir 68.

The apparatus 10, as illustrated again with reference to FIGS. 1 and 2, provides for monitoring of table temperature and fixture temperature through the sensor 54 and controller 52 earlier described. In a preferred embodiment of the present invention, controlling the temperature of the table 20 includes directing a heat transfer fluid 72 from the reservoir 64 through a pump 74 and conduit 76 for pumping the fluid between a passage 78 and the reservoir 64 for controlling the temperature of the table 20 and thus the fixture 22 and package 16. As earlier described with reference to FIG. 2, the heat exchangers 68, 70 are used, thus separating the fluids 60, 72.

By way of further discussion and example, the package 16 used in this process is any package with of a surface that can accept a weldable cover. The cover 12 can be of any configuration that allows for a weld electrode to have access to the cover and carrier 14 for the purpose of flowing electrical current through this interface and causing a temperature rise at the interface sufficient to cause melting of the surface and possibly sub-surface materials to form a bond between the two.

The heat that is generated from the electrical current flow through the package (its materials having electrical resistance) causes a temperature rise. When this temperature rise is sufficient there is a material melting and joining that occurs. This is the weld. Factors that effect the quality of the weld are temperature, time/temperature profile (rate of rise and fall, maximum temp level and time at that temperature level), pressure applied by the electrode to the cover/package interface, the temperature of the electrode just before current starts to flow, the temperature of the package/cover combination just before current starts to flow, the difference between the package/cover combination temperature and the welder electrode temperature just before current starts to flow, the rate at which electrical current is interrupted in a pulsed (ON/OFF) welding system, the pulse width and the pulse shape. In a pulsed system, area of electrode contact, overlap or weld area from one pulse to the next, geometry of the weld electrode and package cover combination in areas particularly where the weld surface is not straight (2D or 3D curved or irregular) also the time of fixture/base contact before weld and the time of electrode/package contact before weld. Other factors that may effect weld are the preheating of the package/cover combination and/or the weld electrode assembly.

A successful weld schedule is defined as a particular set of values for each of the above parameters that (when applied together) will yield the proper weld on a specific package/cover combination. It has been determined that one particular schedule may be replaced by another where 2 or more of these parameter values have been altered such that each compensates for the other so that successful welds still occur even though the schedule has been altered. The object is to apply the correct amount of heat over the correct area for the proper amount of time with sufficient overlap geometry and timing such that the weld is continuous from start point to end point.

It should be understood that the materials used in the construction of various electronic packages, carrier and cover materials, have varying material properties that require a variety of weld schedules to obtain proper welds for each package/cover combo type. Some of these material parameters that effect welding are the thermal resistance, electrical resistance, liquidous temperature (where phase change from solid to liquid occurs), and heat capacity.

The carrier and cover may be made of either the same or different materials. The surface may or may not be treated in some way such as the application of plated metals onto the surface either singularly or in layered build-up. This wide variety of possible package, cover and carrier combinations requires a very flexible welding system to allow for the schedule parameter changes that will encompass all of the possible combinations.

As a result, and as earlier discussed, a primary object of the present invention is to deal specifically with the control of the temperature of the electrode and package before and during the welding process for obtaining a more uniform weld over time from package to package without changing any normal weld schedule parameters.

It has been observed at Sawtek, Inc. during continuous welding in a high production environment that the temperature of the welding electrodes and the fixture that holds the package is unstable and will climb to unacceptable levels periodically. This time temperature profile is erratic and unpredictable to some degree. The method of compensating for this unstable temperature situation is to change the weld schedule periodically to bring the weld interface temperature back into the proper range to obtain the correct weld. There is an optimum temperature at the cover and carrier interface that will yield the best possible weld regardless of weld schedule parameters. The temperature controlled weld electrode and the temperature controlled table and thus fixture is how temperature control (to within acceptable limits) is obtained for the present invention.

To emphasize the importance of temperature control and the need satisfied by the present invention, consider a situation without temperature control. As the welder flows current through the first package within the matrix earlier described, the electrodes and the fixture are typically at the lowest temperature. As the weld current flows there is power dissipated in all areas of current flow where there is electrical resistance to that current flow. This power, in the form of heat (watts) causes a change in temperature to begin to occur in all areas that are able to receive heat from the weld area. The package temperature elevates from start of weld to finish. Some of the heat energy passes through the carrier into the fixture and causes a temperature rise in the fixture. The temperature of the electrode and the fixture start out at a relatively low temperature and begin to rise as welding takes place. The time required to weld one package will cause a rise in electrode and fixture temperature and the time between the end of weld of one package and the beginning of weld of the next package will typically allow the electrodes and the fixture to cool down some amount dependent on surrounding material temperatures, air or gaseous nitrogen (and possibly helium) flow over and around the electrode area, by way of example. Therefore, when the electrode and fixture temperatures are not controlled, it is extremely difficult to predict what the package temperature might be at any given time in the welding process. This lack of control is a problem.

Consider an important effect that a fairly hot weld schedule can have on a cool electrical package, especially a package typically used with surface acoustic wave components. Packages such as the ceramic surface mount type with a metal weld ring around the seal surface may be destroyed in some cases where the heat that is required to weld the first part (at the start of a welding day) may be great enough to cause stress in the package at ceramic/metal interfaces due to the temperature level of the ceramic and metal on either side of the interface. This stress is a product of the mismatch of the coefficient of thermal expansion. When the two materials rise in temperature they do not physically expand at the same rate. As one material expands at a greater rate than the other the stress level (at the interface) rises. Testing and modeling has shown that packages subjected to this type of weld situation often break along this high stress area during or shortly after welding takes place.

Based on testing and modeling such as earlier described, it was determined that controlling the temperature of the weld electrodes and the fixture would greatly enhance the weld process by eliminating the temperature variable and holding the electrode and fixture temperature to within specified limits throughout the welding session whether it lasts for one part or runs continually, 24 hrs/day, 7 days/week.

At Sawtek Inc., the fluid cooled electrodes described herein were designed and build and installed on our matrix seam welder to test this concept. Initial testing showed that we were able to control the electrode temperature by flowing fluid (water) through the electrode housing and then flowing that same water through coils that were immersed in a liquid temperature control bath, the reservoir, so that the water flowed in a continuous loop through the electrode housing and the temperature control bath and maintained the electrode temperature at the bath set point temperature. This resulted in a stabilized welding process. There was no longer a need to ever change weld scheduled for longer welding runs. Yields increased and are now in the 98+% range regularly. (In the past yields were less than 98% and were often less than 90%). It has also been noted that this control feature may be used to make adjustments to the overall weld schedule to enhance welding on all parts. It has become another useful variable in the weld parameter schedule.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and alternate embodiments are intended to be included within the scope of the appended claims.

That which is claimed is:

1. An electric resistance seam welding apparatus useful in sealing a cover to a carrier of a surface mount package carrying an electronic component therein, the seam welding apparatus comprising:

a table for receiving a fixture;

a fixture carried by the table, the fixture in frictional contact with the table for providing a heat transfer therebetween;

a surface mount package carried by the fixture, the package in frictional contact with the fixture for providing a heat transfer therebetween, the surface mount package adapted for receiving an electronic component, the surface mount package comprising a carrier for receiving the electronic component and a cover attachable to the carrier for enclosing the electronic component therein;

a welding electrode for seam welding the cover to the carrier, the electrode adapted for contacting the cover;

electrical current control means for controlling an electrical current flowing from the electrode to the cover for effecting a weld of the cover to the carrier;

electrode temperature sensing means for sensing the temperature of the electrode;

fixture temperature sensing means for sensing the temperature of the fixture;

electrode temperature control means for controlling the temperature of the electrode, the electrode temperature control means communicating with the electrode temperature sensing means; and table temperature control means for controlling the temperature of the table, the table temperature control means communicating with the fixture temperature sensing means for effecting the temperature of the table and thus the fixture and package.

2. The welding apparatus according to claim 1, further comprising moving means for moving the electrode across the cover for seam welding the cover to the carrier, the moving means having pressure control means for providing a contact pressure of the electrode to the cover.

3. The welding apparatus according to claim 1, wherein the cover comprises a metallic material and the carrier comprises a ceramic material, and wherein the package further comprises a seal ring carried between the carrier and the cover for sealing the cover to the carrier.

4. The welding apparatus according to claim 1, wherein the welding electrode comprises a tapered metal roller having a rolling edge portion for contacting the cover.

5. The welding apparatus according to claim 1, wherein the electrode temperature control means comprises:
 a housing for carrying the electrode, the housing comprising a passage adapted for directing a heat transfer fluid therethrough and thus to the electrode;
 a heat transfer fluid;
 a reservoir for storing the heat transfer fluid; and
 pumping means for pumping the fluid between the passage and the reservoir for controlling the temperature of the electrode.

6. The welding apparatus according to claim 5, further comprising temperature control means for controlling the temperature of the fluid within the reservoir.

7. The welding apparatus according to claim 1, wherein the table temperature control means comprises:
 the table comprising a passage adapted for directing a heat transfer fluid therethrough;
 a heat transfer fluid;
 a reservoir for storing the heat transfer fluid; and
 pumping means for pumping the fluid between the passage and the reservoir for controlling the temperature of the table and thus the fixture and package carried by the fixture.

8. The welding apparatus according to claim 7, further comprising temperature control means for controlling the temperature of the fluid within the reservoir.

9. An electric resistance seam welding apparatus useful in sealing a cover to a carrier of a surface mount package carrying an electronic component therein, the seam welding apparatus comprising:
 a table for receiving a fixture;
 a fixture carried by the table, the fixture in frictional contact with the table for providing a heat transfer therebetween, the fixture adapted for receiving a carrier thereon for seam welding a cover to the carrier for forming a package;
 a welding electrode for seam welding the cover to the carrier, the electrode adapted for contacting the cover;
 electrode temperature sensing means for sensing the temperature of the electrode;
 fixture temperature sensing means for sensing the temperature of the fixture;
 electrode temperature control means for controlling the temperature of the electrode, the electrode temperature control means communicating with the electrode temperature sensing means; and
 table temperature control means for controlling the temperature of the table, the table temperature control means communicating with the fixture temperature sensing means for effecting the temperature of the table and thus the fixture.

10. The welding apparatus according to claim 9, further comprising electrical current control means for controlling an electrical current flowing from the electrode to the cover for effecting a weld of the cover to the carrier.

11. The welding apparatus according to claim 9, further comprising a surface mount package carried by the fixture, the package in frictional contact with the fixture for providing a heat transfer therebetween, the surface mount package adapted for receiving an electronic component, the surface mount package comprising a carrier for receiving the electronic component and a cover attachable to the carrier for enclosing the electronic component therein.

12. The welding apparatus according to claim 9, further comprising moving means for moving the electrode across the fixture for seam welding a cover to a carrier, the moving means having pressure control means for providing a contact pressure of the electrode to the cover.

13. The welding apparatus according to claim 9, wherein the welding electrode comprises a tapered metal roller having a rolling edge portion for contacting an edge portion of a package comprising a cover and a carrier, the rolling edge portion adapted for movement along the cover for sealing the cover to the carrier.

14. The welding apparatus according to claim 9, wherein the electrode temperature control means comprises:
 the electrode comprising a passage adapted for directing a heat transfer fluid therethrough;
 a heat transfer fluid; and
 pumping means for pumping the fluid through the passage controlling the temperature of the electrode.

15. The welding apparatus according to claim 9, wherein the table temperature control means comprises:
 the table comprising a passage adapted for directing a heat transfer fluid therethrough;
 a heat transfer fluid; and
 pumping means for pumping the fluid through the passage for controlling the temperature of the table and thus the fixture carried by the table.

16. An electric resistance seam welding apparatus useful in sealing a cover to a carrier of a surface mount package carrying an electronic component therein, the seam welding apparatus comprising:
 a fixture adapted for carrying a package having a cover and a carrier, the fixture providing a heat transfer therebetween, the fixture positioned for communicating with a welding electrode for seam welding the cover to the carrier;
 a welding electrode for seam welding the cover to the carrier, the electrode adapted for contacting the cover;
 fixture temperature sensing means for sensing the temperature of the fixture;
 electrode temperature control means for controlling the temperature of the electrode, the electrode temperature control means communicating with the electrode temperature sensing means; and
 fixture temperature control means for controlling the temperature of the fixture, the fixture temperature control means communicating with the fixture temperature sensing means for affecting the temperature of the fixture.

17. The welding apparatus according to claim 16, further comprising electrode temperature sensing means for sensing the temperature of the electrode.

18. The welding apparatus according to claim 16, further comprising electrical current control means for controlling an electrical current flowing from the electrode to the cover for effecting a weld of the cover to the carrier.

19. The welding apparatus according to claim 16, further comprising moving means for moving the electrode across the fixture for seam welding a cover to a carrier, the moving means having pressure control means for providing a contact pressure of the electrode to the cover.

20. The welding apparatus according to claim 16, wherein the electrode temperature control means comprises heat exchanging means for controlling the temperature of the electrode.

21. The welding apparatus according to claim 16, wherein the fixture temperature control means comprises heat exchanging means for controlling the temperature of the table and thus the fixture carried by the table.

22. A method for seam welding a cover to a carrier of a package for hermetically sealing an electronic component within the package, the method comprising the steps of:
   providing a seam welder having a table for receiving a fixture and an electrode adapted for seam welding a cover to a carrier;
   providing a surface mount package having a carrier for receiving an electronic component and a cover attachable to the carrier for enclosing the electronic component therein;
   mounting the package onto a fixture, the package in frictional contact with the fixture for providing a heat transfer therebetween;
   mounting the fixture onto a table, the fixture being mounted in frictional contact with the table for providing a heat transfer therebetween;
   contacting the cover with the electrode for seam welding the cover to the carrier;
   sensing the temperature of the electrode;
   sensing the temperature of the fixture;
   controlling an electrical current flowing from the electrode to the cover for effecting a weld of the cover to the carrier;
   seam welding the cover to the carrier;
   controlling the temperature of the electrode; and
   controlling the temperature of the table, for affecting the temperature of the table and thus the fixture and package during the seam welding step.

23. The method according to claim 22, further comprising the steps of:
   controlling a contact pressure between the electrode and the cover; and
   moving the electrode across the cover for seam welding the cover to the carrier.

24. The method according to claim 22 further comprising the step of placing a seal ring between the carrier and the cover for sealing the cover to the carrier.

25. The method according to claim 22, wherein the welding electrode comprises a tapered metal roller having a rolling edge portion for contacting the cover, and wherein the step of seam welding the cover to the carrier includes the step of rolling the electrode along a contacting edge of the cover.

26. The method according to claim 22, wherein the electrode temperature controlling step comprises the steps of:
   providing a housing for carrying the electrode, the housing comprising a passage adapted for directing a heat transfer fluid therethrough and thus to the electrode;
   providing a heat transfer fluid;
   providing a reservoir for storing the heat transfer fluid; and
   pumping the fluid between the passage and the reservoir for the controlling of the electrode temperature.

27. The method according to claim 26, further comprising the step of controlling the temperature of the fluid within the reservoir.

28. The method according to claim 22, wherein the package temperature controlling step comprises the steps of:
   providing a passage within the table for directing a heat transfer fluid therethrough;
   providing a heat transfer fluid;
   providing a reservoir for storing the heat transfer fluid; and
   pumping the fluid between the passage and the reservoir for controlling the temperature of the table and thus the fixture and package carried by the fixture.

29. The welding apparatus according to claim 28, further comprising the step of controlling the temperature of the fluid within the reservoir.

30. A method for seam welding a cover to a carrier of a package for hermetically sealing an electronic component within the package, the method comprising the steps of:
   providing a seam welder having a table for receiving a package having a carrier and a cover, the seam welder having an electrode adapted for seam welding the cover to the carrier;
   mounting a package onto the table, the package mounting sufficient for providing a heat transfer therebetween;
   sensing the temperature of the table for determining a temperature of the package;
   seam welding the cover to the carrier;
   controlling the temperature of the electrode; and
   controlling the temperature of the table, for affecting the temperature of the table and thus the package during the seam welding step.

31. The method according to claim 30, further comprising the step of sensing the temperature of the electrode.

32. The method according to claim 30, further comprising the step of controlling an electrical current flowing from the electrode to the cover for effecting a weld of the cover to the carrier.

33. The method according to claim 30, further comprising the steps of:
   controlling a contact pressure between the electrode and the cover; and
   moving the electrode across the cover for seam welding the cover to the carrier.

34. The method according to claim 30 further comprising the step of placing a seal ring between the carrier and the cover for sealing the cover to the carrier.

35. The method according to claim 30, wherein the electrode temperature controlling step comprises the step of providing heat exchanging means for controlling the temperature of the electrode.

36. The method according to claim 30, wherein the table temperature controlling step comprises the step of providing heat exchanging means for controlling the temperature of the table and thus the package carried by the table.

* * * * *